_United States Patent Office_

3,711,448
Patented Jan. 16, 1973

3,711,448
MORPHOLINEAMIDE OF α-CYANOACRYLATES AND POLYMERS THEREOF
Murray Goodman, Brooklyn, and Albert Wartman, New York, N.Y., assignors to Sutures, Inc., Coventry, Conn.
No Drawing. Filed June 7, 1971, Ser. No. 150,811
Int. Cl. C08f 3/74; C07d 93/10, 87/34
U.S. Cl. 260—78.4 N                                6 Claims

ABSTRACT OF THE DISCLOSURE

Monomers having the formula:

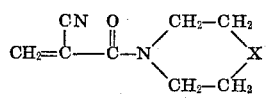

wherein X is oxygen, sulfur or —CH₂—, and film-forming polymers thereof. The monomers are useful to form polymeric adhesives.

BACKGROUND OF THE INVENTION

Certain derivatives of α-cyanoacrylic acid, most notably the alkyl esters, have been found to possess excellent utility as adhesive compositions requiring no heat or catalyst during the bonding operation. These materials are useful in bonding a great variety of materials together to form laminated articles which strongly resist fracture of the adhesive bond. The ease of polymerization of these materials, however, is itself a problem since the poor stability of the monomer leads to poor shelf life and the necessity of using special diluents, stabilizers, and the like. It is an object of the present invention to provide a novel monomeric derivative of α-cyanoacrylic acid. It is a further object to provide such a monomer which is capable of being easily polymerized to form an adhesive. It is still a further object to provide such a monomer which is quite stable. It is still a further object to provide film-forming adhesive polymer from the monomers.

BRIEF SUMMARY OF THE INVENTION

The foregoing and other objects which will become apparent in light of the detailed description which follows are achieved according to the present invention by providing monomers having the formula

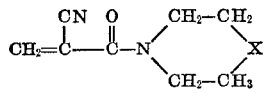

wherein X is a member selected from the group consisting of an oxygen atom, a sulfur atom, and the group —CH₂—. The monomer is readily polymerizable in the presence of water, methanol, or the like, to form adhesive films in the conventional manner. The monomers, however, are quite stable in solvents such as acetonitrile in which conventional adhesives of this type are very unstable.

DETAILED DESCRIPTION

There follows a detailed description of a preferred embodiment of the invention. However, it is to be understood that the detailed description is provided solely for the purpose of illustrating a preferred embodiment and that the invention is capable of numerous modifications and variations apparent to those skilled in the art without departing from the spirit and scope of the invention.

The monomers are preferably prepared by a Knoevenagel condensation reaction between nascent formaldehyde and a cyanoacetamide having the formula:

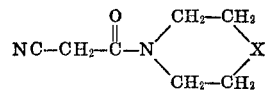

wherein X is oxygen, sulfur, or —CH₂—. The acetamide is preferably prepared by reacting a lower alkyl alpha cyanoacetate, such as methyl-α-cyanoacetate, with morpholine, thiomorpholine, or piperidine. The monomers are polymerizable in the presence of water or methanol, by free radical initiation and thermally to form polymer adhesives.

EXAMPLE I

To one liter of morpholine at its boiling point is added dropwise over a period of 2 hours, 600 ml. of methyl-α-cyanoacetate. At the same time methanol is removed by fractional distillation at 60–90° C., as the pot temperature increases from 110° to 127° C. After 3 hours a total 350 ml. methanol is collected. The reaction mixture is then cooled, and the volatiles removed under reduced pressure to a pot temperature of 110–115° C. The crude product is purified by two recrystallizations from methanol (two parts). The product is dried under vacuum over phosphorus pentoxide. Yield 560 g., M.P. 86–89° C. The product can also be distilled before crystallization, B.P. 150°/0.005 mm., 170°/0.03 mm. A lower yield is obtained by this alternate route. Preferably, at least one mole of morpholine is used per mole of the cyanoacetate. A slight excess is preferred. Thiomorpholine or piperidine can be utilized in place of the morpholine to form the analagous thiomorpholine monomer or the piperidine monomer.

EXAMPLE II

The monomer is prepared by a Knoevenagel condensation reaction. Into a 500 ml., three-necked flask fitted with a mechanical stirrer, a Dean and Stark trap and a dropping funnel is charged: 9.5 g. paraformaldehyde (0.285 mole), 30 ml. methanol, 10 ml. diethylene glycol dimethyl ether and 0.2 ml. piperidine. To the refluxing mixture is added dropwise a solution of 51.3 g. morpholine amide of α-cyanoacetic acid (0.33 mole) dissolved in 50 ml. methanol. After the addition, the mixture is kept refluxing for 2 hours, the methanol is then removed until the temperature is 88° C. in the vapor phase inside the reaction flask. At this time 200 ml. benzene are added and water is removed by azeotropic distillation (5.7 ml. over 6 hours–theoretical amount is 5.7 ml.). A distillation head is then installed and all the volatiles are removed under reduced pressure, for 10 hours, at 0.002 mm. while heating in an oil bath at 155–160° C.

All the glassware for contact with distilling monomer is then treated in the following manner:

(1) Twenty minutes in a freshly prepared solution of 30% NaOH, at 110–120° C.;
(2) Washed thoroughly with water fifteen times and with distilled water five times. Dried in oven;
(3) Treated for five minutes with dimethyldichlorosilane and then drained thoroughly.

The joint connecting the distillation flask to the distillation head is lubricated with high vacuum silicone grease; all the other joints are lubricated with Apiezon N grease to provide a nonpolar surface at the joints. After changing the distillation head and the receiver with treated glassware, 10 g. phosphorus pentoxide are added to the reaction flask and a capillary bleed for SO₂ is installed. About 6 g. of monomer are distilled while the heating oil bath was 175–203° C., the vapor temperature 172–184° C. and the vacuum 0.04 mm. or better. The product is collected in a receiver cooled with liquid nitrogen. The monomer obtained is a solid and can be recrystallized from carbon tetrachloride (four parts) M.P. 58.5–60° C.

The monomer is further characterized by its nuclear magnetic resonance (n.m.r.) spectrum with two vinyl protons at τ=3.51 and 3.65 and the methylene protons at τ=6.38. The intensity of the signals is in agreement with the expected structure. The analysis of the monomer is as follows:

Calculated (for $C_8H_{10}N_2O_2$) (percent): C, 57.82; N, 16.86; H, 6.07. Found (percent): C, 57.53; N, 16.62; H, 5.93.

Alternatively, the analogous thiomorpholine or the piperidine compounds can be used to produce the analagous monomers. The formaldehyde used in the reaction is preferably non aqueous and dry purified formaldehyde can be used in lieu of paraformaldehyde. The reaction is catalyzed by a conventional basic Knoevenagel reaction catalyst such as piperidine, quinoline, ion exchange resin, or alkaline metal hydroxides. Alcohols higher than methanol can be utilized as a solvent for the formaldehyde and as a stabilizer for the methylol reaction product of formaldehyde with the cyanoacetate. The glycol ether provides a high boiling solvent for plasticizing the crude product, allowing it to be easily stirred. It also solubilizes the paraformaldehydes. Other high boiling glycol ethers such as triglyme, as well as high boiling phosphate esters, such as trimethyl phosphate, tricresylphosphate, and the like, are suitable. The mole ratio of formaldehyde to amide can vary widely. However, a molar ratio of about 0.8:1 to 1.2:1 is preferred and a molar ratio of about 0.95:1 to 1.0:1 is still more preferable. Solvents other than benzene such as toluene, xylene and higher boiling aromatics are conveniently utilized for removal of water by azeotropic distillation. Dehydrating agents other than phosphorous pentoxide, such as acetic anhydride, thionyl chloride, phosphoric acid, carbodiimides, and the like, can be utilized.

The monomers according to the invention are utilized as adhesives in the conventional manner, and are suitable for bonding together such materials as glass, metal, wood, textiles, rubber, plastics, and similar materials into laminated articles of great strength. The monomers can be provided in any inert solvent and are remarkably stable in solvents such as acetonitrile in which previous monomers of this general type are unstable. The amount of solvent useful in preparing monomer solutions will vary greatly depending on desired characteristics such as viscosity, but will generally be about 10 to 90% by weight based on the weight of the solution. Conventional stabilizers are not required in inert solvents under most storage conditions but may be employed to prevent polymerization under extreme storage conditions.

Adhesives of the cyanoacrylate type are generally known to be useful in medical and surgical applications such as the adhesion of bones and other tissue. The adhesives according to the present invention are also useful in this respect and are advantageous in providing good transport properties for body fluids relative to, for example, the alkyl alpha cyanoacrylates. Accordingly, the invention provides biomembranes and bioadhesives of excellent performance.

What is claimed is:

1. Monomers having the formula:

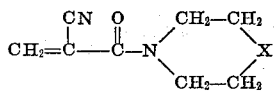

wherein X is a member selected from the group consisting of an oxygen atom, a sulfur atom, and the group —$CH_2$—.

2. A monomer according to claim 1 wherein X is an oxygen atom.

3. A monomer according to claim 1 wherein X is a sulfur atom.

4. A monomer according to claim 1 wherein X is a —$CH_2$— group.

5. A film-forming homopolymer including a plurality of repeating units having the formula:

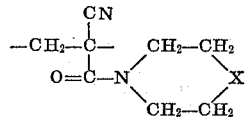

wherein X is a member selected from the group consisting of an oxygen atom, a sulfur atom, and the group —$CH_2$—.

6. An adhesive composition comprising a compound as claimed in claim 1 and an inert solvent therefor.

References Cited

UNITED STATES PATENTS 3,564,078    2/1971    Wicker _____ 260—881

HARRY WONG, JR., Primary Examiner

C. A. HENDERSON, JR., Assistant Examiner

U.S. Cl. X.R.

117—122 R, 126 R, 127, 138.8 R, 139, 147; 128—92, 334; 260—243 B, 247.7 K, 294.7